May 2, 1967 R. A. NYLANDER 3,317,820
VOLTAGE REGULATOR EMPLOYING VARIABLE DUTY CYCLE
MODULATING OF THE UNREGULATED VOLTAGE
Filed March 27, 1964

INVENTOR.
R. A. NYLANDER
BY
ATTORNEY
AGENT

United States Patent Office 3,317,820
Patented May 2, 1967

3,317,820
VOLTAGE REGULATOR EMPLOYING VARIABLE DUTY CYCLE MODULATING OF THE UNREGULATED VOLTAGE
Richard A. Nylander, Lawndale, Calif., assignor to the United States of America as represented by the Secretary of the Air Force
Filed Mar. 27, 1964, Ser. No. 355,517
3 Claims. (Cl. 323—22)

The purpose of this invention is to provide efficient regulation of direct voltages at medium power levels through the mechanism of variable duty cycle modulation of the unregulated voltage.

Essentially the regulator circuit comprises a transistor switch connected between the unregulated source and the load. The transistor is switched on and off at a high frequency by an oscillatory circuit incorporating a four-layer diode. The resulting rectangular wave output of the transistor switch is integrated in a filter circuit to derive its average value which is the output voltage of the regulator. The circuit is so designed that the duty cycle of the rectangular wave, to which its average value is proportional, is inversely related to the unregulated supply voltage, with the result that a change in supply voltage changes the duty cycle in such direction as to oppose a change in load voltage. The circuit design permits operation in the 20 to 100 watts power range with four-layer diodes having a low value of holding current.

Figure 1:
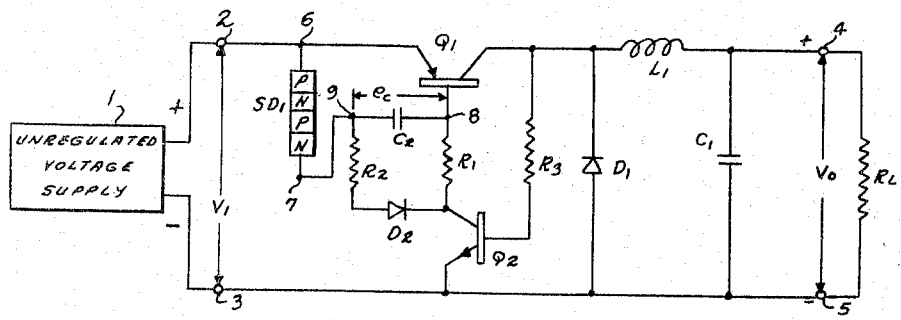
Figure 2:
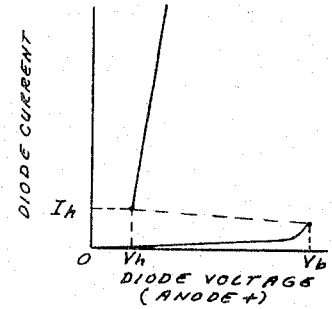
Figure 3:
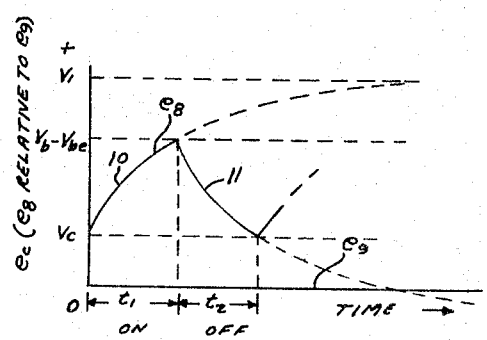
Figure 4:
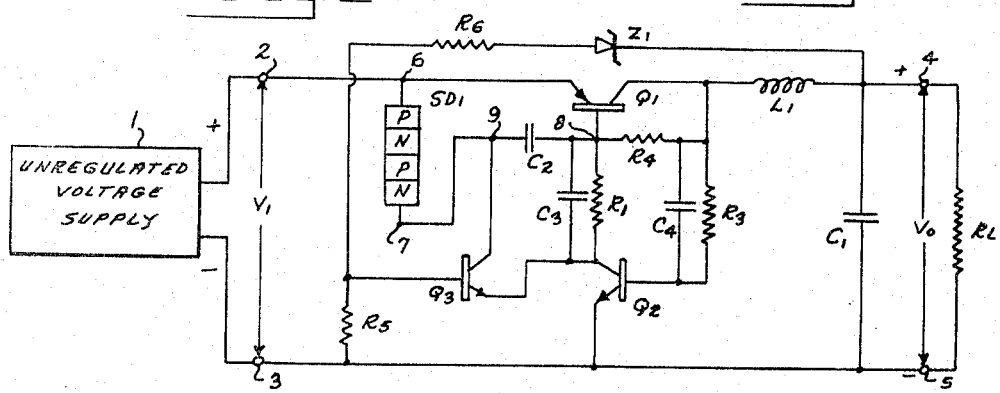

The invention will be described in more detail with reference to the specific embodiments thereof shown in the accompanying drawings in which FIG. 1 is a schematic circuit diagram of one embodiment of the invention, FIG. 2 illustrates the characteristics of a four-layer diode for positive anode voltages, FIG. 3 is a waveform illustrating the switching action of the circuit, and FIG. 4 is a modification of FIG. 1.

Referring to FIG. 1, an unregulated input voltage from source 1 is applied to input terminals 2–3 of the regulator circuit and the regulated voltage $V_o$ appears at its output terminals 4–5 for application to load $R_L$. Transistor $Q_1$ has its emitter-collector path connected in series with the load. This transistor acts as a switch which may be turned on or off by controlling the base voltage relative to the emitter. When on, there is a very low impedance between emitter and collector; when off, the emitter-collector impedance is very high and analogous to an open switch. As the switch is turned on and off cyclically, a rectangular wave of voltage occurs at the collector. This wave is integrated by a low-pass filter circuit comprising series inductance $L_1$ and shunt capacitor $C_1$. As a result, the voltage across $C_1$ and output terminals 4–5 is proportional to the average value of the rectangular wave. Since the average value of the wave is directly related to its duty cycle, the value of $V_o$ may be controlled by controlling the duty cycle of switch $Q_1$. The diode $D_1$ removes transient negative voltages by providing a discharge path for $L_1$ when $Q_1$ is turned off.

The network consisting of four-layer diode $SD_1$, capacitor $C_2$, resistors $R_1$, $R_2$ and $R_3$, and transistor $Q_2$ form an oscillatory circuit for cyclically switching $Q_1$ on and off. The operation of this circuit may be explained by reference to FIGS. 2 and 3.

FIG. 2 shows the general characteristic of a four-layer diode in the positive anode region. The anode end of diode $SD_1$ is the end of P type material connected to terminal 6. Terminal 7 is connected to the cathode end. The construction and operation of these diodes are well known in the art and described in the literature. Briefly, however, as the diode voltage increases from zero the diode exhibits a very high impedance until the breakover voltage $V_b$ is reached. At this voltage the impedance suddenly drops to a low value similar to the forward impedance of a PN junction. The diode will remain in the low impedance state until the voltage and current are reduced below the holding values $I_h$ and $V_h$. When these values are passed through, the diode reverts to its high impedance state.

To describe the operation, assume $SD_1$ to be in its off or high impedance state and that it had switched to that state at a value of $e_c$, the voltage across $C_2$, equal to $V_c$. FIG. 3 shows the values of $e_c$ measured at terminal 8 relative to terminal 9. Thus, at the start of the waveform in FIG. 3, $e_8$ is positive relative to $e_9$ by the amount $V_c$. Therefore, with $SD_1$ off, $C_2$ charges through the emitter-base diode of $Q_1$, and thence through $R_2$, $D_2$ and $Q_2$ to terminal 3, causing $e_8$ to increase exponentially along Part 10 of the waveform from the potential $V_c$ toward a potential only slightly less than $V_1$. $Q_2$ is on at this time since its base is connected through $R_3$ to the collector of $Q_1$, which is also on because of the just described emitter-base current in this transistor.

As $C_2$ charges, the voltage across $SD_1$ increases since it is equal to $e_c + V_{be}$, where $V_{be}$ is the base-emitter potential of $Q_1$. Therefore, when $e_c$ reaches the value $V_b - V_{be}$, the voltage across $SD_1$ reaches its breakover value $V_b$ and this diode switches to its low impedance or on state. When $SD_1$ turns on, the voltage across its terminals drops considerably due to its much lower impedance. This causes the base potential of $Q_1$ to rise relative to the emitter, since $e_c$ can not change immediately, turning this transistor off. This in effect opens the emitter-collector circuit of $Q_1$ and cuts $Q_2$ off, the base of this transistor being driven down to emitter potential by the transient in $L_1$.

With point 8 positive relative to point 9 by the amount $V_b - V_{ee}$, $D_2$ is reverse biased and therefore nonconductive. With both $D_2$ and $Q_2$ nonconductive $C_2$ can discharge only through the base-collector leakage of $Q_1$. $C_2$ now discharges exponentially along Part 11 of the waveform in FIG. 3 until the current through $SD_1$ has fallen to the holding value $I_h$ at which time $SD_1$ turns off, or reverts to its high impedance state. This occurs at a value of $e_c$ equal to $V_c$. With $SD_1$ in effect an open switch, the base of $Q_1$ drops in potential relative to the emitter, turning $Q_1$ on and initiating a new cycle of operation.

As stated earlier, $Q_1$ acts as a switch between unregulated source 1 and the load. When $Q^1$ is on, source 1 is connected to the load; when off, source 1 is disconnected from the load. As explained above, $Q_1$ is on during the time $t_1$ when $C_2$ is charging along Part 10 of the waveform of FIG. 3 and is off during the time $t_2$ when $C_2$ is discharging along Part 11 of the waveform. Consequently, the duty cycle of the resulting rectangular wave at the output of switch $Q_1$ is $$\frac{t_1}{t_1 + t_2}$$

$V_o$ is the average value of this wave as derived by the integrating circuit $L_1$–$C_1$. Therefore, neglecting losses, (1)
$$V_o = V_1 \frac{t_1}{t_1 + t_2}$$

which may be rearranged to give (2)
$$V_o = V_1 \frac{t_1}{t_2} \cdot \frac{1}{1 + \frac{t_1}{t_2}}$$

The frequency of the oscillatory circuit is (3) $$f = \frac{t_1}{t_1 + t_2}$$

For a given load voltage $V_o$ and supply voltage $V_1$, $t_1/t_2$ is determined from Equation 2. The load current determines the transistor $Q_1$ type and the parameters $\beta$ and $V_{be}$, $\beta$ being the current gain or ratio of collector current to base current. $R_1$ is determined by the minimum value of $R_L$ and $\beta$, being the product of the two. The particular four-layer diode used for $SD_1$ determines $V_b$, $V_h$ and $I_h$. $R_2$ may be quite large, reducing the capacitance of $C_2$ for a given frequency. This enables operation at relatively high power with four-layer diodes having a low value of $I_h$. The $Q_1$ off time is dependent on the base-collector leakage of $Q_1$ which may be stabilized by connecting a resistor $R_4$ in shunt as seen in FIG. 4. The $Q_1$ on time depends upon $R_2$ which may be made variable to control $V_o$.

That the circuit operates as a voltage regulator may be seen from FIG. 3. If $V_1$ increases, $C_2$ charges along Part 10 of the waveform toward a higher voltage and therefore at a faster rate. As a result, $e_c$ reaches the value $V_b - V_{be}$ sooner and $t_1$ is shortened. In charging in the other direction along Part 11, $C_2$ also charges toward a higher voltage and therefore at a faster rate. However, as $V_1$ increases $V_c$ decreases, since $e_c$ and $V_1$ are additive in the discharge circuit of $C_2$ so that a higher $V_1$ requires a smaller $e_c$ for the current $I_h$. Therefore, $t_2$ remains constant or increases. Consequently, an increase in $V_1$ results in a decrease in $t_1/t_2$ which opposes a change in $V_o$, as seen in Equation 4.

Some improvement in voltage regulation may be obtained by modifying FIG. 1 as shown in FIG. 4. In this circuit, $R_2$ and $D_2$ of FIG 1 are replaced by the collector-emitter path of an NPN transistor the base of which is biased from the output voltage by a potential divider consisting of zener diode $Z_1$ and resistors $R_5$ and $R_6$. This, in effect, causes $R_2$ to be inversely related to $V_o$ so that an increase in $V_o$ raises the base potential of $Q_3$ and reduces the value of $R_2$, i.e., the collector-emitter impedance of $Q_3$. This results in a further increase in the charging rate along Part 10 of the waveform of FIG. 3 and a further reduction in $t_1$, producing a more effective regulation.

As stated earlier, $R_4$ is used in FIG. 4 to stabilize the base-collector leakage of $Q_1$. Capacitors $C_3$ and $C_4$ are added to shorten the switching speeds.

I claim:

1. A voltage regulator circuit comprising: a pair of input terminals, between which an unregulated voltage is applied, and a pair of output terminals, one of said input terminals constituting a point of reference potential; a direct connection of substantially zero impedance between one of said output terminals and said point of reference potential; a first transistor; an inductive reactor; a conductive connection including the emitter-collector path of said first transistor and said reactor as series elements in the order named between the other input terminal and the other output terminal; a capacitive reactor connected across said terminals; a resistor and the collector-emitter path of a second transistor connected in the order named between the base of said first transistor and said point of reference potential; and a four-layer diode having one terminal connected to said other input terminal and its other terminal connected through a capacitor to the base of said first transistor and through a two-terminal network having resistance and unidirectional conductivity to the junction of said resistor and said second transistor.

2. Apparatus as claimed in claim 1 in which said two-terminal network is the collector emitter path of a third transistor, and in which means are provided for establishing the base of said third transistor at a potential relative to said point of reference potential that is directly related to the potential between said output terminals.

3. Apparatus as claimed in claim 2 in which a leakage stabilizing resistor is connected between base and collector of said first transistor.

No references cited.

JOHN F. COUCH, *Primary Examiner.*

K. D. MOORE, G. GOLDBERG, *Assistant Examiners.*